United States Patent
Desbiolles

(10) Patent No.: US 6,837,116 B2
(45) Date of Patent: Jan. 4, 2005

(54) DEVICE FOR THE MEASUREMENT OF THE TORSION TORQUE APPLIED TO A ROTATING SHAFT

(75) Inventor: Pascal Desbiolles, Thorens Glieres (FR)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 10/094,496

(22) Filed: Mar. 8, 2002

(65) Prior Publication Data

US 2002/0166389 A1 Nov. 14, 2002

(30) Foreign Application Priority Data

Mar. 9, 2001 (FR) .............................................. 01 03256

(51) Int. Cl.[7] .................................................. G01L 3/02
(52) U.S. Cl. .................................................. 73/862.335
(58) Field of Search ............. 73/650, 862.331–862.336, 73/862.328

(56) References Cited

U.S. PATENT DOCUMENTS

| | | | | |
|---|---|---|---|---|
| 3,589,178 A | * | 6/1971 | Germann ................ | 73/862.326 |
| 4,450,729 A | * | 5/1984 | Troeder et al. ........ | 73/862.328 |
| 4,533,902 A | * | 8/1985 | Baker et al. .................... | 341/9 |
| 4,732,494 A | * | 3/1988 | Guers et al. ................. | 384/448 |
| 5,046,372 A | * | 9/1991 | Taniguchi et al. ...... | 73/862.335 |
| 5,955,878 A | | 9/1999 | Peilloud et al. ............. | 324/165 |
| 6,294,910 B1 | * | 9/2001 | Travostino et al. ..... | 324/207.25 |
| 6,554,096 B2 | * | 4/2003 | Tokumoto .................... | 180/446 |
| 6,564,653 B2 | * | 5/2003 | Desbiolles ............. | 73/862.335 |
| 6,573,710 B1 | * | 6/2003 | Santos et al. .......... | 324/207.25 |

FOREIGN PATENT DOCUMENTS

WO  WO 00/62020  10/2000

* cited by examiner

*Primary Examiner*—Hezron Williams
*Assistant Examiner*—Rose M. Miller
(74) *Attorney, Agent, or Firm*—Michael Best & Friedrich LLP

(57) ABSTRACT

A device for the analog measurement of a torsion torque, a steering column incorporating the device and a module comprising the device. The device comprising a test body which can be deformed by torsion, first and second magnetic pulse generators connected in the vicinity of a first and of a second end, respectively, of the test body, a first and a second analog magnetic sensor, and an electronic treatment device capable of forming, from input analog signals A, B, C, D which are functions of the detected signals, the output signal $F(A, B, C, D)=((B*C)-(A*D))/((B*D)+(A*C))$ which is a function of the torque applied to said shaft.

16 Claims, 3 Drawing Sheets

DEVICE FOR THE MEASUREMENT OF THE TORSION TORQUE APPLIED TO A ROTATING SHAFT

BACKGROUND

The invention concerns a device for measurement of the torsion torque applied to a rotating shaft, a method to measure the torque by means of such a device, a steering column as well as a module comprising such a device.

For example, it pertains to the measurement of the torsion torque applied to a steering column of a vehicle through the intermediary of the steering wheels.

The term steering column conventionally denotes a tubular element attached to the body of the vehicle, under the dashboard, which guides and supports the transmission shaft connected to the steering wheel.

The steering wheel is then a device for manual control, which is connected to the steering wheels and used by the driver to steer the vehicle.

The invention also concerns the uncoupled steering columns. In contrast to the conventional steering columns, the uncoupled steering columns are not connected with a gear box which transforms the circular movement of the steering wheel into the angular displacement of the steering arm which causes the orientation of the wheels.

However, with such uncoupled directions, there is no direct mechanical link between the steering wheels and the wheels which are resting on the ground, whether the vehicle is an actual vehicle or belongs to a simulation system.

This simulation can pertain to a game object, connected with learning in driving schools, or it can be pertain to interactive driving simulation for the needs of car builders.

In such simulators, the compensation for the stresses at the level of the steering wheel, thanks to a mechanism which generates a resistant torque on the steering wheel as a function as the type of vehicle to be simulated, which may or may not be steered using a power steering system, must take into account the driving conditions to be recreated.

The measurement of the torque applied to the steering wheel is consequently essential to ensure a good simulation in real time.

The measurement of the torque on the shaft of the steering wheel is also very important in automated steering systems of assisted steering systems.

Indeed, triggering the assistance notably depends on the torque applied by the driver to the steering wheel.

The device for measuring the torsion torque used in automated steering systems emits a signal which indicates the orientation torque applied by the driver to the steering wheel and thus to the transmission shaft of the steering wheel of the vehicle.

This signal is conventionally addressed to a steering assistance calculator which triggers the assisted steering system, for example by controlling an electrical motor, in the case of an electrical automated steering system.

The invention can also apply to other fields such as the field of transmission of forces, for example to the wheels of the vehicle or to the control of the orientation of said vehicle by means of the measurement of the applied torque.

Devices are already known for measuring the torsion torque, which devices use stress gauges which are glued to a test body.

This type of technology presents the drawback of requiring a rotating passage which, for reasons pertaining to space requirement and reliability, is not desirable, notably for measuring the torque applied to a steering column of a vehicle.

Other technologies are also known in which one measures the angle of deformation of the test body for example through the intermediary of a change in a magnetic coupling or of a characteristic of the material placed under tension, or by measuring two input and output angles of the torque bar.

For example, the detection of the angular shift of two generators of magnetic fields with reference to detecting devices allows the delivery of an analog signal proportional to the applied torque.

This type of analog magnetic technology presents a certain number of drawbacks, in particular connected with a permanent control of the gap over one turn to preserve the measurement precision, and with the temperature compensation of the output signal which requires a differential measurement system.

Thus, in the context of the analog devices for measuring torques of the prior art, the control of the gap and of the temperature drifts complicates the assembly because of the requirement to use a more space consuming mechanical system.

Moreover, the document EP-0 284 508 describes a device for measuring the torque which uses two magnetic coders which are respectively connected in the vicinity of each end of a torque bar. In this device, the signals of the first coder are detected by a pair of sensors, while the signals of the second coder are detected by a sensor. The signals so obtained are treated by a microprocessor to obtain the applied torque.

To eliminate variations in the gap, this document proposes the use of a high pass filter, but this solution is not entirely satisfactory, because, by eliminating only the low frequency signals, it does not present a sufficient effectiveness.

In addition, the device described in the document EP-0 284 508, by determining a temporal difference between the detected signals, does not allow the obtention of the applied torque when the speed of rotation is zero.

Therefore, the invention is intended to overcome these drawbacks notably by proposing a device for the measurement of the torsion torque applied to a rotating shaft whose output signal can be rendered independent of, on the one hand, the amplitude of the read magnetic field and thus of the variations in the gap, and, on the other hand, the decrease in the magnetic field due to the temperature, while, at the same time, being reliable and adapted to a severe environment of the automobile type.

Thus, it makes it possible to work in a broad gap range and it avoids a differential measurement to compensate for the temperature drifts.

SUMMARY

According to a first aspect, the invention proposes a device for the measurement of the torsion torque applied to a rotating shaft, notably to a steering column of a vehicle, said device comprising a test body which can be deformed by torsion under the action of the torque applied to said shaft, as well as a first and the second means for the generation of magnetic pulses, in which:
  the first means is connected with the test body in the vicinity of a first end of the latter;
  the second means is connected with the test body in the vicinity of a second end of the latter;
  a first analog magnetic sensor which is fixed with respect to the rotating shaft is arranged opposite to and at gap distance from of the first means, said sensor being capable of delivering an analog signal S1 and a squared analog signal C1 in quadrature;

a second analog magnetic sensor which is fixed with respect to the rotating shaft is arranged opposite to and at gap distance from the second means, said sensor being capable of delivering an analog signal S2 and the squared analog signal C2 in quadrature;

said device comprising in addition:

an electronic treatment device capable of forming, from the input analog signals A, B, C, D which are functions of the signals S1, C1, S2 and C2, the output signal $F(A, B, C, D) = ((B*C)-(A*D))/((B*D)+(A*C))$ which is a function of the torque applied to said shaft.

According to a second aspect, the invention proposes a method for measuring the torque by means of an above-described measuring devices, said method comprising the steps of:

measurement of the analog signals S1, C1, S2 and C2;

equalization of the amplitude of the signals S1, C1 and that of the signals S2, C2;

formation of the signal F(S1, C1, S2, C2).

According to a third aspect, the invention proposes a method for measuring the torque by means of an above-described measuring device, said method comprising the steps of:

measurement of the analog signals S1, C1, S2 and C2;

equalization of the amplitude of the signals S1, C1 and that of signals S2, C2;

application of the gain G to the signals S1 and C1 or S2 and C2 formation of the signals S'N=SN+GCN and C'N=GSN+CN, with N=1 or 2;

formation of the output signal F(S'1, C'1, S1, S2) or F(S1, C1, S'2, C'2).

According to a fourth aspect, the invention proposes a steering column comprising an above-described device for the measurement of the torsion torque, in which the test body is integrated in the column.

According to a fifth aspect, the invention proposes a module for the measurement of the torsion torque applied to a rotating shaft, said module comprising an above-described device and means of connection of said module with, respectively, two parts of the shaft, said shaft lacking a test body.

According to a sixth aspect, the invention proposes a module for the measurement of the torsion torque applied to a rotating shaft, said module comprising an above-described device and means of connection of said module with, respectively, one end of the shaft and the device which applies the torque, said shaft lacking a test body.

BRIEF DESCRIPTION OF THE DRAWINGS

Other objects and advantages of the invention will become apparent in the following description which is made with reference to the drawings in the appendix, in which.

DETAILED DESCRIPTION OF THE PREFERRED EMBODIMENTS

Figure 1:
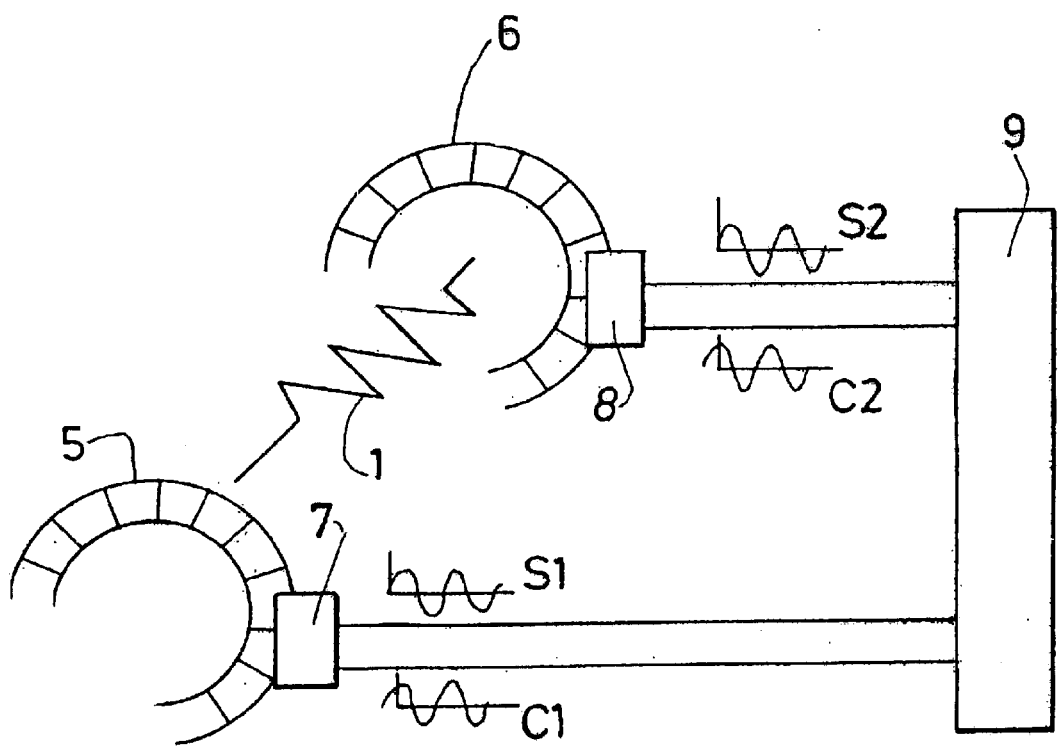
FIG. 1 is functional scheme of a device for the measurement of the torsion torque applied to a rotating shaft according to the invention.
Figure 2:
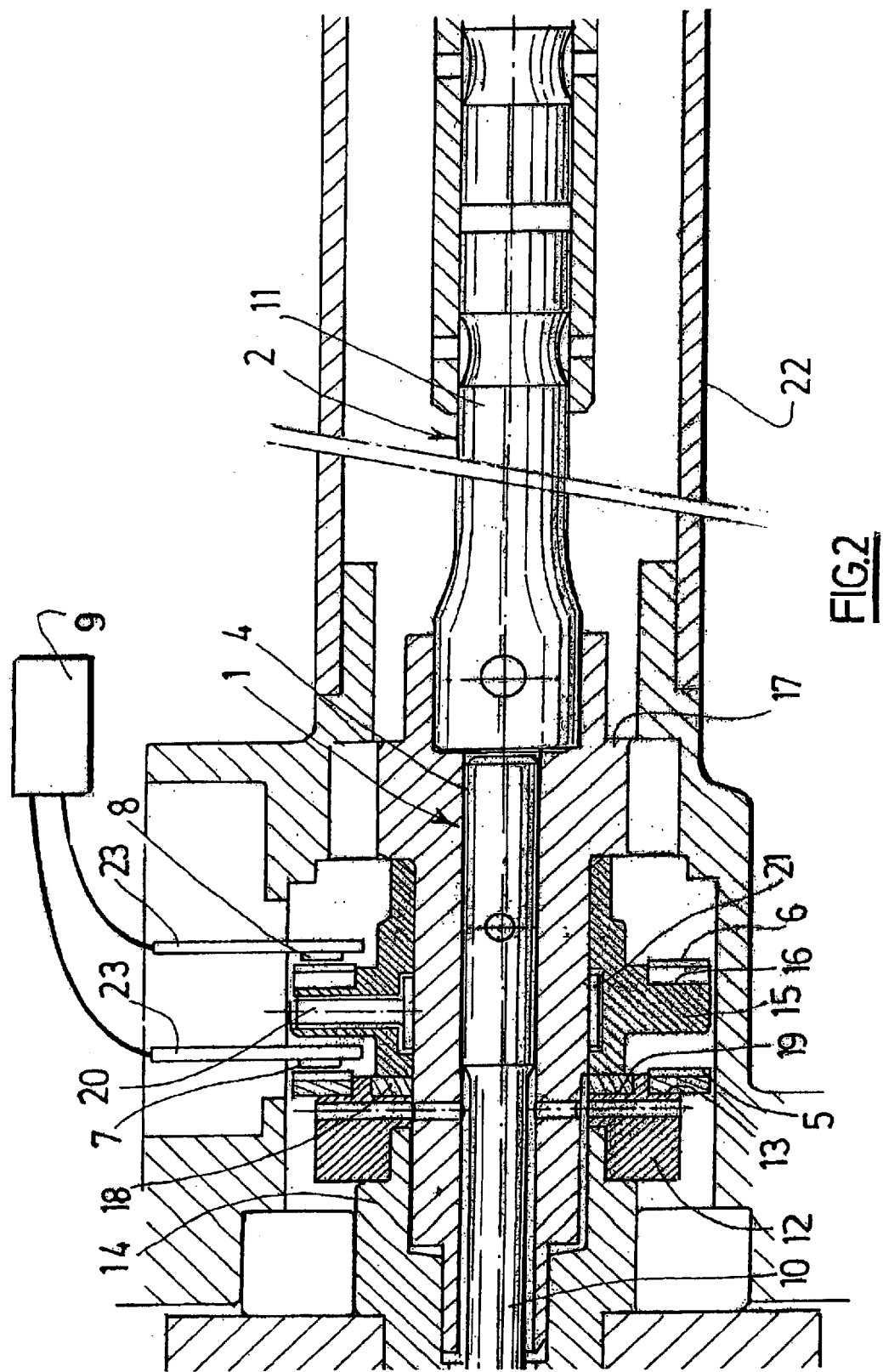
FIG. 2 is a partial view and a longitudinal cross section of a steering column integrating a device for the measurement of the torsion torque which is applied to it.
Figure 3:
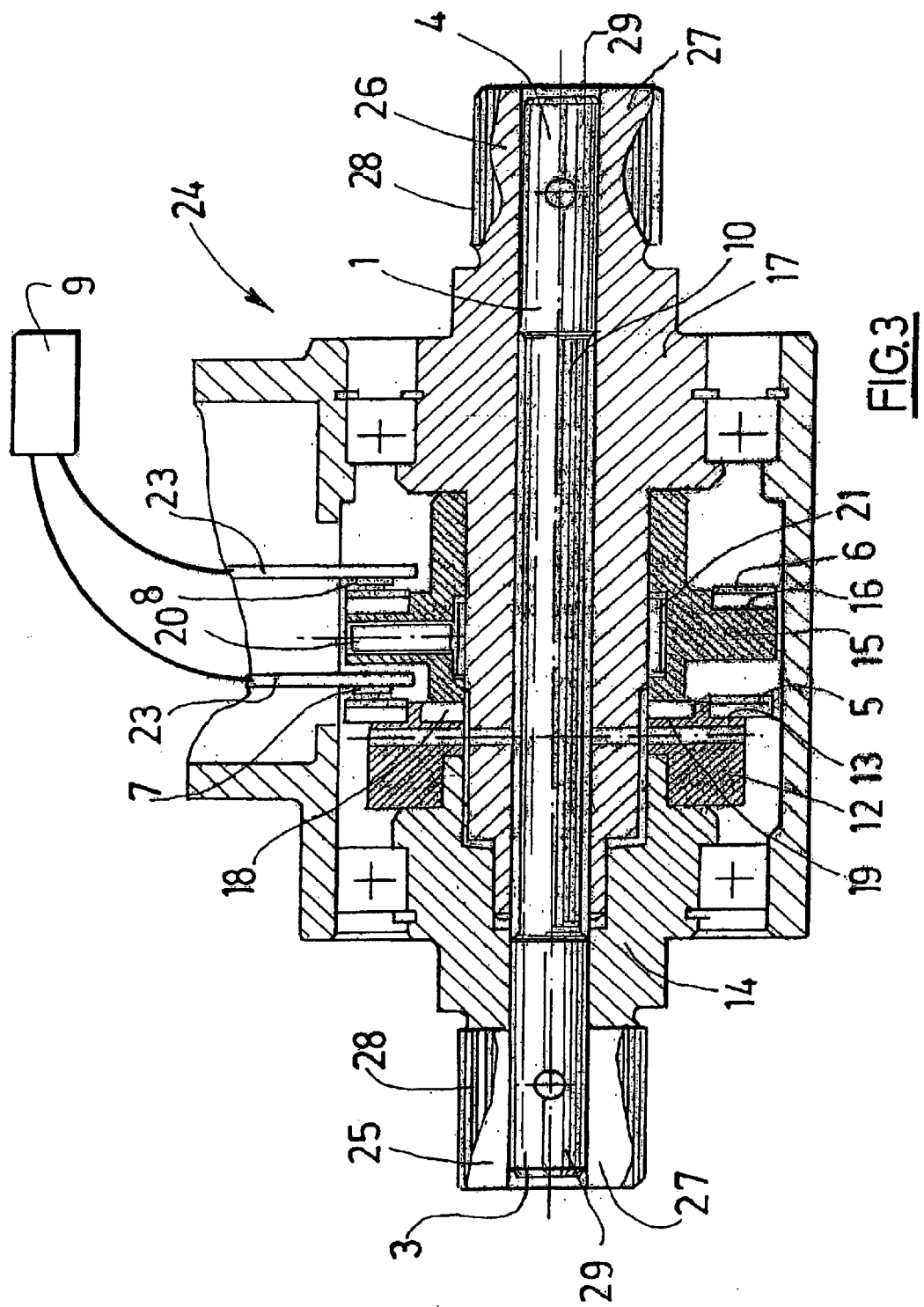
FIG. 3 is a partial view and a longitudinal cross section of a module for the measurement of the torsion torque applied to a rotating shaft.

In FIGS. 1–3, a device for the measurement of the torsion torque applied to a rotating shaft is represented, which is of the type comprising a test body 1 which can be deformed with torsion due to the action of the torque applied to said shaft.

In a particular example (see FIG. 2), the rotating shaft is a steering column 2 of the vehicle to which an orienting torque is applied by the driver with the aid of steering wheel.

To determine this orientation torque, it is known to provide a test body 1 which is capable of transmitting the applied torque by elastically deforming under the action of said torque.

The measurement of the torque applied can then be sent, notably in the form of an electric signal, to a steering assistance calculator which triggers the assistance, for example through the intermediary of an electrical motor in the case of an electrical automated steering system.

The test body 1 is typically in the form of a torque bar having a smaller diameter than that of the shaft because, with isotropic linear elasticity, the torque applied with pure torque to a solid cylindrical bar having a circular cross section which varies for a given material as a function of the fourth power of the diameter of the bar, with fixed angle of torque.

Consequently, the fact of making a zone with reduced cross section allows, under the influence of the applied torque, the concentration and the amplification of the deformations by torsion of said zone to make it a privileged zone for the measurement of the value of the torque.

In the embodiment variants represented in the figures, the torsion bar 1, which is arranged coaxially with respect to the shaft, has a cylindrical cross section. However, as a function of the constraints of usage, the arrangement of the torsion bar 1 and/or the geometry of its cross section can be designed to be different.

The test body 1 presents a first end 3 and a second end 4 which, under the influence of the torque applied to the shaft moved in rotation jointly with the shaft, but with an angular shift between the two.

To measure this angular shift to calculate the torque applied to the shaft, electronic means are used which take into account the type of test body 1.

To this effect, one uses a device comprising a first means for generating magnetic pulse 5 and a second means for generating magnetic pulse 6, or coders which are provided in the respective vicinities of the first end 3 or the second end 4 of the test body 1.

According to an embodiment example (see FIG. 1), the means for the generation of pulses, 5, 6, are formed, respectively, from a multipolar ring made of a synthetic material charged with ferrite particles and formed of a plurality of contiguous fields with reversible of direction of magnetization of one given field with reference to the two fields which are contiguous to it.

The device comprises, in addition:

a first and a low magnetic sensor 7 which is fixed with respect to the rotating shaft which is arranged opposite to it and at gap distance from the first coder 5;

a second analog magnetic sensor 8 which is fixed with respect to the rotating shaft which is arranged opposite to it and at gap distance from the second coder 6; and an electronic treatment device 9 for the signals originating from said sensors 7, 8.

The treatment device 9 can be integrated into a computer which controls at least one function of the vehicle, for example for electrical assisted steering or trajectory control.

Sensors 7, 8 comprise, for example, at least two sensing elements and one bar of sensing elements chosen from the Hall-effect probes, the magneto resistances, the giant magneto resistances, where said sensing elements are placed at gap distance from the means for generating magnetic pulses 5, 6.

In a known manner, the sensors 7, 8 are each capable of delivering an analog signal S1 and analog signal C1 in quadrature, for example the sensors can comprise two sensing elements which are separated angularly by an interval of n+0.5n (where n is the length of a magnet) (see FR-2 599 794), or a plurality of substantially aligned elements, as described in the application FR-2 792 403. The sensors 7, 8 can also be capable of measuring the normal and tangential components of each delivered field.

The sensors 7, 8 being arranged at a sufficient distance from the magnetic pulse generating means 5, 6, one can consider the delivered signals to be of sinusoidal shape, to have the same amplitude, and to be centered about the same mean value and in quadrature one with respect to the other. In addition, they have a period which is a function of the number N of pair[s poles or mechanical 2/N.

The electronic treatment device 9 can be provided so that, from these signals, an in a manner which is known, for example, from document FR-2 769 087, deliver the relative or absolute position of at least one of the coders 5, 6 and thus of the associate shaft, with respect to a fixed structure.

In the variant, an interpolation device which increases the angular resolution of the output signals, as described in the document FR-A-2 754 063, can be used.

The value of this position, notably in the case where it is absolute, can then be used, alone or in combination with the measurement of the applied torque, in a safety system of a device, such as an anti-skid system, an anti-blocking system, an anti-roll system or a navigational aid system.

Two variants for the treatment of signals in the electronic device 9 are described below.

In a first treatment variant, and in the case where the coders 5, 6 are perfectly indexed one with respect to the other, at a torque of zero, the signals S1 and S2, respectively C1 and C2, are in phase, the signals are written as follows:

$S1 = A1s(\theta) * \sin(\theta);$ $C1 = A1c(\theta) * \cos(\theta);$ $S2 = A2s(\theta) * \sin(\theta + \delta);$ $C2 = A2c(\theta) * \cos(\theta + \delta).$ where $\delta$ corresponds to the phase shifting connected with the angle of torsion of the bar and $A1s(\theta), A1c(\theta), A2s(\theta), A2c(\theta)$ are the respective amplitudes of the signals.

The amplitudes $A1s(\theta), A1c(\theta), A2s(\theta), A2c(\theta)$ depend on the polar length seen, that is the tolerance in the placement of the sensors 7, 8 opposite the coders 5, 6.

Prior to the treatment of signals, one equalizes the amplitude of the signals S1, C1 and that of the signals S2, C2, for example by in situ programming of the EEPROM, ZENER ZAPPING type or an equivalent, which allows the best possible adjustment of the amplitudes after the placement of the sensors 7, 8.

In the case where the gap varies over one turn because of a defect in the material or the flatness of the coders 5, 6, the amplitudes $A1s(\theta), A1c(\theta), A2s(\theta),$ and $A2c(\theta)$, in addition, vary as function of angles $\theta$.

To overcome these variations, one can use a sensor 7, 8 comprising a plurality of substantially aligned elements and treat the output signals as described in the application FR-2 792 403. Indeed, one thus obtains an averaging effect of the signals detected by the sensing elements which allows a strong decrease in the variation over one turn of the amplitudes $A1s(\theta), A1c(\theta), A2s(\theta), A2c(\theta)$.

After the equalization of the amplitudes, one forms, with the aid of the treatment device 9, the signal:

$F(S1, C1, S2, C2) - ((C1*S2) - (S1*C2))/((C1*C2) + (S1*S2))$

By developing the calculation and simplifying by the amplitudes which are equal, one obtains:

$F(S1, C1, S2, C2) = \tan(\delta).$

The output signal, which is the tangent of the angle of torsion of the bar 1 thus allows a direct measurement of the torque applied to the shaft.

In addition, the output signal being independent of the amplitude of the input signals, the measurement of torque obtained is insensitive to variations in the gap or to the decrease in the magnetic field due to the temperature.

In addition, the measurement of torque being carried out by the spatial treatment of the signals, the device is capable of delivering the value of the torque, even when the shaft is not in rotation.

Moreover, as the tangent function can be approximated to a straight line for small angles of deformation, it is possible to choose dimensions for the torsion bar 1 so that the output signal is substantially linear as a function of the applied torque.

According to another embodiment, notably in an application of the type with variable assisted steering system, the torsion bar 1 can have dimensions chosen so that the output signal exits from this linear zone so that, when the vehicle is stopped, the electrical assisted steering system supplies a larger torque for a substantially stronger torque applied by the driver.

In a special example, the magnetic pulse generating means 5, 6 can be indexed during the magnetization and during the assembly of the device.

Indeed, the quality of magnetization of the coders 5, 6 can be such that the lengths of the period vary throughout the entire length of the coders 5, 6, notably due to a deficiency in the alignment of the magnetization head.

One means to overcome these defects consists in indexing the coders 5, 6 both with respect to the magnetization and the mounting, so that the defects are in phase and thus no longer influence the quality of the output signal.

In a second treatment variant, the device 9 allows, on the one hand, to put these defects in phase by an electronic route and, on the other hand, to electronically obtain an output signal of zero under a torque of zero.

Indeed, a mechanical indexing of the coders 5, 6 allows, in most cases, only a partial solution of the problem of adjusting the zero of the device 9.

A simple solution to solve this problem is to set a coarse mechanical positioning of the sensors 7, 8 opposite the coders 5, 6, and use the signals:

S'1=S1+GC1 and C'1=GS1+C1 in which G is a gain which can be programmed in situ.

In an equivalent manner which will only be described below, one can use the signals S'2=S2+GC2 and C'2=CS2+C2.

The signals S'1 and C'1 are brought out of phase with respect to the signals S1 and C1 by an angle $\phi$ which is a function of the gain G since $\tan(\phi) = -G$.

Thus, by in situ programming of the gain G, it is possible to modify the angle to annul the function F(S'1, C'1, S2, C2) under a torque of zero.

After the installation of the device and prior to its use, it is thus possible to program the gain G so as to obtain a signal F(S'1, C'1, S2, C2) which is, on the one hand, zero under a torque of zero and, on the other hand, a function of the applied torque, as described in the context of the first embodiment variant.

By using electronic phase shifting, this embodiment makes it possible to avoid a precise mechanical positioning of the sensors 7, 8 in front of the coders 5, 6.

In the two treatments variants presented here, the variant can be carried out either in an analog mode using electronic operators or in a digital manner using an analog-digital converter of the signals and the microprocessor.

In connection with FIG. 2, an embodiment variant is described below of a steering column 2 comprising a measuring device as described above.

The test body 1, which is made in the shape of a cylindrical part presenting a zone with decreased diameter, 10, is connected with two parts of the column 11.

In a variant, the test body 1 can be integrated in the column 2 in the form of a zone having a reduced diameter which is integrally connected to it.

The steering column 2 is combined, on the one hand, with a steering wheel and, on the other hand, with a gear box, for example a rack, which converts the circular movement of the steering wheel into an angular displacement of the steering arm which causes orientation of the wheels.

The first ring-shaped part 12 which carries on its axial surface 13 the first coder 5 is connected with a steering column 1 in the vicinity of a first end 3 of the test body 1.

The connection of the first part 12 to the column 2 is carried out by means of a first ring-shaped support 14 which is slipped onto said column 2.

A second ring-shaped part 15, which carries, on an axial surface 16 opposite the first coder 5, the second coder 6 is connected to the steering column 2 in the vicinity of a second end 4 of the test body 1.

The connection of the second part 15 to the column 2 is carried out by means of a second ring-shaped support 17, whose shape is complementary to the first ring-shaped support 14, which is slipped onto said column 2.

The positioning of the second part 14 with respect to the first part 12 is carried out by applying the second part 15 against a washer 18 arranged in a space 19 provided in the first part 12, said washer 18 being substantially in the same axial plane as the surface 13 which carries the first coder 5.

A second part 15 comprises a threaded axial space 20 intended to receive a screw which, as it works in corporation with a tightening ring 21, allows, on the one hand, to integrally connect the second part 15 with rotation to the column 2 and, on the other hand, to axially block the assembly consisting of the two parts 12, 15 which carry the decoders 5, 6.

For reasons of compactness, the shape of the two supports 14, 17 is provided with axial uncouplings so that the two coders 5, 6 are essentially in the same axial plane and axially close to each other.

In a variant (not shown) the two coders 5, 6 can be connected, respectively, to one end of the test body 1.

The column 2 is arranged so that it can rotate in a fixed sheath 22, formed for example of a hollow tube. The sensors 7, 8 are associated with this sheath, for example by clipping on a support 23 which carries them at gap distance from a coder 5, 6, respectively, to axially detect the delivered field.

The treatment device 9 is provided at a distance from the sheath 22, for example at the level of a central computer of the vehicle, to deliver a signal which is proportional to the applied torque.

When a torque is applied to the steering column 2 through the intermediary of the steering wheel, the latter transmits it to the gear box by rotating by a certain angle. The test body 1, notably by its geometry and/or the type of material which comprises it, is arranged so as to transmit the rotational movement while being subjected to elastic torsion due to the action of this torque.

This torsion results in the ends 3, 4 of the test body 1, and thus the means connected therewith, moving in a rotational motion jointly with the column, but with at angular shift with respect to each other, said shift increasing proportionally with the intensity of the torque.

The geometry and/or type of material comprising the test body are provided so that, over the entire zone of normal use of the steering column 2, on the one hand, the torsion does not exceed the elastic limit of the material and, on the other hand, the angular shift is detectable by the treatment device 9 used.

The sensors 7, 8, by measuring the angular position of each one of the coders 5, 6, allow the obtention of the value of the torque, as described above.

FIG. 3 represents a module for measuring the torsion torque 24 applied to a rotating shaft, said module 24 comprising a device for measuring torque, as described above.

The module 24 is intended to be inserted, optionally in a removable manner, between two parts of an assembly to which the torque to be measured is applied.

To this effect, the module 24, whose general structure is identical to that of the above-described column 2 will not be detailed, in addition comprises connection means 25, 26 for connecting said module 24 with this assembly.

According to a first variant, the module 24 is intended to be integrated between two parts of the steering column 2, said column 2 lacking a test body 1.

According to a second variant, the module 24 is intended to be integrated between the steering column 2 and a steering wheel, said column 2 lacking a test body 1.

The connection means 25, 26 represented in FIG. 3, of which there are two, each consists of a ring-shaped part 27, whose surface 28 is grooved, said parts 27 extending respectively on both sides of the module 24. For example (see FIG. 3), each part 27 is provided at one end with a cylindrical part 29, having a diameter which is substantially identical to that of the column 2, and whose other end is integrally connected with the test body 1. In this embodiment, the assembly formed by the test body 1 and connection means 25, 26 is a mono-block assembly.

The part of column 2 and/or the device applying the torque can be integrally connected by these two grooved annular parts 27, respectively, notably by tight fitting, so that the assembly so formed is capable, on the one hand, of transmitting the torque, and, on the other hand, of measuring it.

Such a module 24 presents the advantage of being compact and forming an independent assembly which can be associated, optionally in a removable manner, which an assembly to which a torque to be transmitted and measured is applied.

What is claimed is:

1. Device for the measurement of the torsion torque applied to a rotating shaft, said device comprising:
   a deformable test body having first and second ends;

first and second means for the generation of magnetic pulses, the first means is connected with the test body in the vicinity of the first end thereof and the second means is connected with the test body in the vicinity of the second end thereof;

a first analog magnetic sensor which is fixed with respect to the test body is arranged opposite to and at gap distance from the first means for generation of magnetic pulses; said first analog magnetic sensor configured to deliver a first analog signal S1 and a second analog signal C1 in quadrature;

a second analog magnetic sensor which is fixed with respect to the test body is arranged opposite to and at gap distance from the second means for the generation of magnetic pulses, said second analog magnetic sensor configured to deliver a third analog signal S2 and a fourth analog signal C2 in quadrature; and an electronic treatment device configured to form from input analog signals A, B, C, D which are functions of the signals S1, C1, S2 and C2, the output signal $F(A, B, C, D)=((B*C)-(A*D))/((B*D)+(A*C))$ which is a function of the torque applied to said shaft.

2. Device according to claim 1, characterized in that the signals A, B, C and D are equal to the signals S1, C1, S2 and C2, respectively.

3. Device according to claim 1, characterized in that the electronic treatment device in addition comprises means for the application of an adjustable gain G to the signals S1 and C1 or S2 and C2, and means for the formation of signals S'N=SN+GCN and C'N=GSN+CN, with N=1 or 2, the signals A, B, C, and D being equal to the signals S'1, C'1, S2 and C2, or the signals S1, C1, S'2 and C'2, respectively.

4. Device according to claim 1, characterized in that the treatment device comprises electronic operators configured to deliver the output signals.

5. Device according to claim 1, characterized in that the treatment device comprises an analog-digital converter for signals and a microprocessor configured to deliver the output signals.

6. Device according to claim 1, characterized in that the magnetic sensors comprise at least two sensing elements chosen from Hall effect probes, magneto resistances, giant magneto resistances.

7. Device according to claim 6, characterized in that the magnetic sensors comprise a plurality of essentially aligned elements.

8. Device according to claim 1, characterized in that the pulse generating means are respectively formed of a multipolar ring which is made of a synthetic material charged with ferrite particles and formed from a plurality of contiguous fields with reversible direction of magnetization of one given field with respect to two fields which are contiguous with it.

9. Device according to claim 1, characterized in that the device further delivers the angular position of the rotating shaft.

10. Method for measuring the torque by means of a measuring device according to claim 2, characterized in that it comprises the steps of:

measuring the analog signals S1, C1, S2, and C2;

equalizing the amplitude of the signals S1, C1 and that of the signals S2, C2; and forming the signal F(S1, C1, S2, C2).

11. Method for measuring the torque by means of a measuring device according to claim 3, characterized in that it comprises the steps of:

measuring the analog signals S1, C1, S2, and C2;

equalizing the amplitude of the signals S1, C1 and that of the signals S2, C2;

applying the gain G to the signals S1 and C1 or S2 and C2 forming the signals S'N=SN+GCN and C'N=GSN+CN, with N=1 or 2;

forming the output signal F(S'1, C', S2, C2) or F(S1, C1, S'2, C'2).

12. Method according to claim 11, characterized in that it comprises a prior step of determining the value of the gain G so that the output signal is zero under a torque of zero.

13. Method according to claim 10, characterized in that the step of equalizing the amplitude of the signals is carried out by in situ programming of an EEPROM, ZENER ZAPPING circuit, or an equivalent.

14. Steering column comprising a device for measurement of the torsion torque according to claim 1, characterized in that the test body is integrated in the column.

15. Module for the measurement of the torsion torque applied to a rotating shaft, said module comprising a device according to claim 1 and means of connection of said module with, respectively, two parts of the shaft.

16. Module for the measurement of the torsion torque applied to the rotating shaft, said module comprising a device according to claim 1 and means of connection of said module with, respectively, one end of the shaft and a device which applies torque to the shaft.

* * * * *

UNITED STATES PATENT AND TRADEMARK OFFICE
CERTIFICATE OF CORRECTION

PATENT NO. : 6,837,116 B2
DATED : January 4, 2005
INVENTOR(S) : Pascal Desbiolles It is certified that error appears in the above-identified patent and that said Letters Patent is hereby corrected as shown below:

Column 4,
Line 58, delete "and a low" and replace with -- analog --.

Column 10,
Line 25, delete "forming the output signal F(S'1, C', S2, C2)" and replace with
-- forming the output signal F(S'1, C'1, S2, C2) --.

Signed and Sealed this

Fourth Day of October, 2005

JON W. DUDAS
*Director of the United States Patent and Trademark Office*